(12) United States Patent
Besshi et al.

(10) Patent No.: US 8,314,728 B2
(45) Date of Patent: Nov. 20, 2012

(54) REMOTE CONTROL SYSTEM

(75) Inventors: Takuma Besshi, Osaka (JP); Tsutomu Yamagiwa, Osaka (JP); Takaya Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 496 days.

(21) Appl. No.: 12/632,902

(22) Filed: Dec. 8, 2009

(65) Prior Publication Data

US 2010/0149017 A1  Jun. 17, 2010

(30) Foreign Application Priority Data

Dec. 16, 2008  (JP) ................................. 2008-319236

(51) Int. Cl.
*G08C 19/16* (2006.01)
(52) U.S. Cl. ...................................... 341/176; 340/12.28
(58) Field of Classification Search .................. 341/173, 341/174, 176; 340/5.1, 5.2–5.24, 5.8, 12.22–12.28, 340/12.52, 825.69, 825.72
See application file for complete search history.

(56) References Cited

U.S. PATENT DOCUMENTS 6,791,467 B1 * 9/2004 Ben-Ze'ev ................. 340/12.25
2003/0117294 A1   6/2003 Hatano et al.
2007/0018845 A1 * 1/2007 Sutardja .................... 340/825.69
2007/0052548 A1 * 3/2007 Hankin et al. ............ 340/825.69
2008/0253772 A1 * 10/2008 Katsuyama .................... 398/106
2009/0085765 A1 * 4/2009 Bruhn ....................... 340/825.69
2009/0109053 A1 * 4/2009 Itoh .......................... 340/825.69
2011/0148685 A1 * 6/2011 Welten .......................... 341/176
2012/0200400 A1 * 8/2012 Arling et al. ............... 340/12.28

FOREIGN PATENT DOCUMENTS

JP          2003-174685         6/2003
JP          2008263308 A  *  10/2008

* cited by examiner

*Primary Examiner* — Howard Williams
(74) *Attorney, Agent, or Firm* — Panasonic Patent Center

(57) ABSTRACT

A remote control system includes a remote control receiver storing an operation code controlling an electronic device, and a remote control transmitter operable to store a received operation code. The remote control receiver is operable to read the stored operation and to transmit the read operation code to the remote control transmitter. The remote control transmitter is operable to store the transmitted operation code, and to transmit the stored operation code to the remote control receiver according to operation on the operation unit. The remote control receiver is operable to control the electronic device according to the operation code transmitted from the remote control transmitter. The remote control system remotely controls the electronic device reliably with simple operation.

2 Claims, 10 Drawing Sheets

FIG. 3A
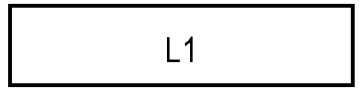
FIG. 3B
FIG. 3C
| Key | Operation Code |
|---|---|
| 22B | C11 |
| 22E | C12 |
| ⋮ | ⋮ |
FIG. 3D
FIG. 3E

FIG. 4A
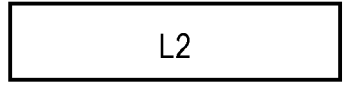
FIG. 4B
FIG. 4C
| Key | Operation Code |
|-----|----------------|
| 22D | C21 |
| 22E | C22 |
| ⋮ | ⋮ |
FIG. 4D
FIG. 4E

FIG. 8A
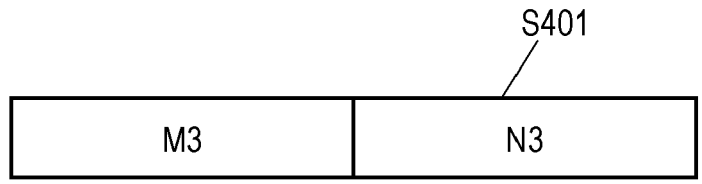
FIG. 8B
| Key | Operation Code |
|---|---|
| 52P (1) | C31 |
| 52P (2) | C32 |
| ⋮ | ⋮ |
N3
FIG. 8C

REMOTE CONTROL SYSTEM

TECHNICAL FIELD

The technical field relates to a remote control system for remotely controlling various electronic devices.

BACKGROUND

As electronic devices, such as television receivers, video recorders, disk recorders, have recently had advancing functions, a remote control transmitter having a learning function which can store operation codes for remotely operating the devices have been used.

FIG. 9 is a plan view of conventional remote control transmitters 6 and 7.

Case 1 of remote control transmitter 6 has substantially a box shape and is made of insulating resin. Plural operation keys 2A and 2B each operating switch contacts protrude movably up and down or slidably from upper and side surfaces of case 1, thus constituting operation unit 2. Case 1 accommodates a circuit board with plural wiring patterns on upper and lower surfaces of the board. Various electronic components mounted onto the upper and lower surfaces of the circuit board constitute transmitting unit 3, receiving unit 4, and controller 5.

Operation unit 9 including plural operation keys 9B and 9C is provided on the upper and side surfaces of case 8 of remote control transmitter 7. Transmitting unit 10 and controller 11 implemented by various electronic components are accommodated in case 8. Controller 11 stores operation codes for, e.g. a television receiver.

After a user presses operation key 2A of operation unit 2 of remote control transmitter 6 for learning, and then, presses operation key 2B for, e.g. playback, the switch contacts beneath the key are connected and disconnected electrically. Controller 5 detects the electrical connection and disconnection of the switch contacts, and remote control transmitter 6 is ready for storing operation codes.

Next, while the user presses operation key 2A of remote control transmitter 6, the user presses operation key 9B for playback of remote control transmitter 7 facing remote control transmitter 6. Then, controller 11 detects the electrical connection and disconnection of the switch contacts beneath the keys, and allows transmitting unit 10 to transmit, to remotely control transmitter 6, an operation code corresponding to playback as a remote control signal.

Receiving unit 4 of remote control transmitter 6 receives the signal transmitted from remote control transmitter 7, and controller 5 allocates the operation code for playback to operation key 2A corresponding to playback which is pressed, and stores the operation code.

Then, while the user presses operation key 2C indicating the numeral, "1", for channel selection of remote control transmitter 6, the user presses operation key 9C indicating the numeral, "1", of remote control transmitter 7 as to allow transmitting unit 10 to transmit an operation code for selecting channel "1".

Remote control transmitter 6 receives the transmitted operation code. Controller 5 allocates the operation code for selecting channel "1" to operation key 2C indicating the numeral, "1", for channel selection, and stores the operation code.

After that, while the user presses keys of operation unit 2 of remote control transmitter 6 sequentially, the user presses keys of operation unit 9 of remote control transmitter 7 sequentially as to transmit a remote control signal, accordingly allows controller 5 of remote control transmitter 6 to store operation codes corresponding to the keys.

Next, when the user directs remote control transmitter 6 to a television receiver and presses, for example, operation key 2C, controller 5 detects electrical connection and disconnection of switch contacts beneath key 2C, and allows transmitting unit 3 to transmit an operation code for selecting channel "1" as a remote control signal to change a channel of the television receiver into channel "1".

That is, while the user arranges remote control transmitter 7 storing the operation codes for the television receiver to face remote control transmitter 6, the user presses the keys of operation units 2 and 9 alternately one after another to perform a learning operation. The learning operation allows remote control transmitter 6 to store the operation codes stored in remote control transmitter 7, thereby allowing the user to remotely control, with remote control transmitter 6, the television receiver operated with remote control transmitter 7.

Conventional remote control transmitters 6 and 7 perform the learning operation with the user pressing alternately and sequentially the keys of operation units 2 and 9 of remote control transmitter 6 to be learned and remote control transmitter 7 storing the operation codes. Thus, the transmitters 6 and 7 require the user to execute complicated, troublesome operation, accordingly causing operation errors, such as the pressing of wrong operation key.

SUMMARY

A remote control system includes a remote control receiver storing an operation code controlling an electronic device, and a remote control transmitter operable to store a received operation code. The remote control receiver is operable to read the stored operation and to transmit the read operation code to the remote control transmitter. The remote control transmitter is operable to store the transmitted operation code, and to transmit the stored operation code to the remote control receiver according to operation on the operation unit. The remote control receiver is operable to control the electronic device according to the operation code transmitted from the remote control transmitter.

The remote control system remotely controls the electronic device reliably with simple operation.

BRIEF DESCRIPTION OF DRAWINGS

FIGS. 3A to 3E schematically illustrate signals of the remote control system according to Embodiment 1.

FIGS. 4A to 4E schematically illustrate signals of the remote control system according to Embodiment 1.

FIGS. 8A to 8C schematically illustrate signals of a remote control system according to Exemplary Embodiment 3.

DETAILED DESCRIPTION OF PREFERRED EMBODIMENTS

Exemplary Embodiment 1

Figure 1:
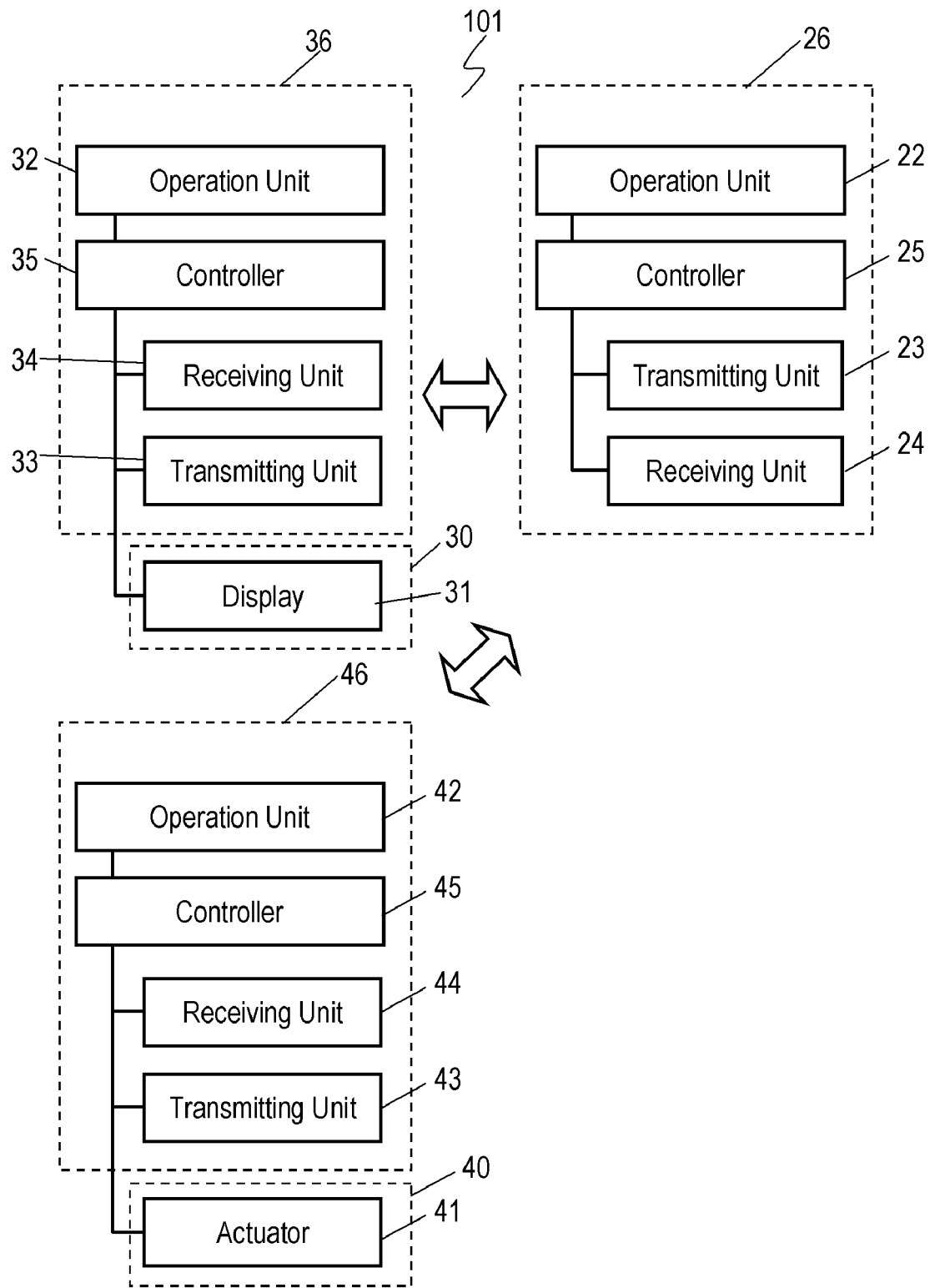
FIG. 1 is a circuit block diagram of a remote control system according to Exemplary Embodiment 1.
Figure 2:
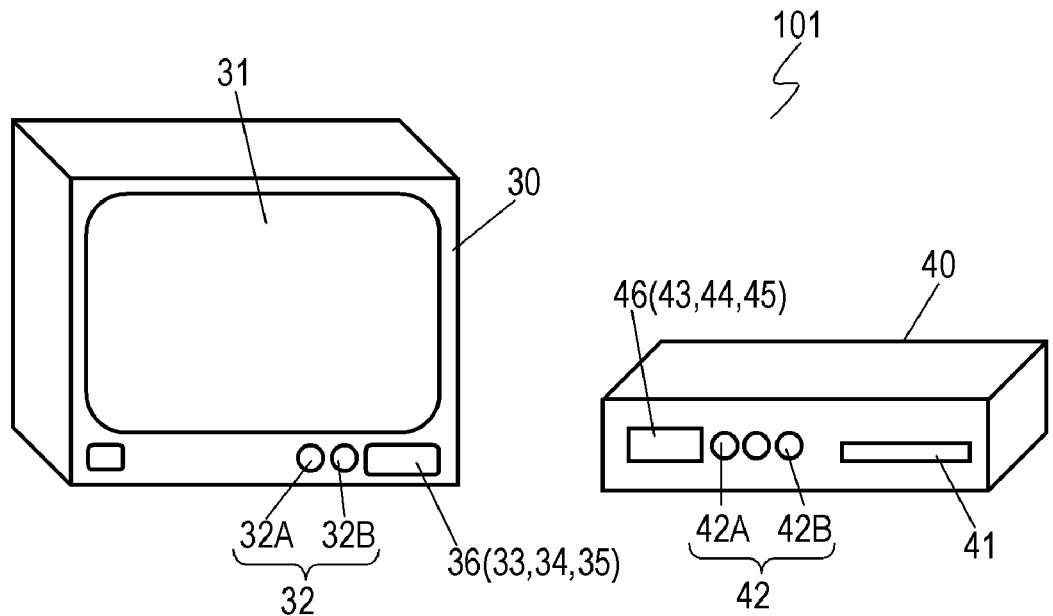
FIG. 2 is a schematic diagram of the remote control system according to Embodiment 1.
Figure 2:
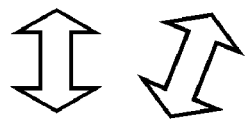
Figure 2:
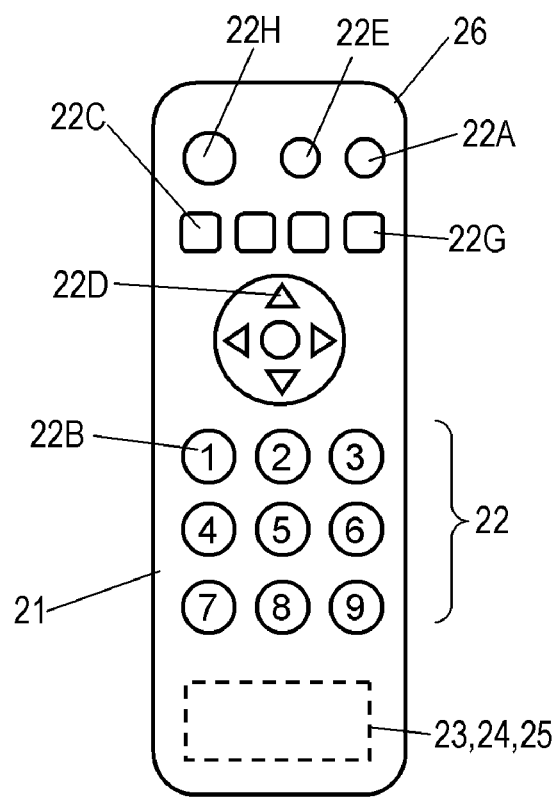

FIGS. 1 and 2 are a circuit block diagram and a schematic diagram of remote control system 101 according to Exemplary Embodiment, respectively. Remote control system 101 includes remote control transmitter 26 and remote control receivers 36 and 46. According to Embodiment 1, remote control transmitter 26 exchanges signals with remote control receivers 36 and 46 via radio waves.

Remote control transmitter 26 includes case 21 having substantially a box shaped and made of insulating resin, such as polystyrene or ABS. Plural operation keys 22A to 22H activating switch contacts protrudes movably up and down from upper and side surfaces of case 21. Plural operation keys 22A and 22B are made of rubber or insulating resin, and constitute operation unit 22. Case 21 accommodates a circuit board therein. The circuit board includes an insulating board made of insulating material, such as paper phenol or glass-containing epoxy, and plural wiring patterns made of conductive material, such as copper foil, provided on upper and lower surfaces of the insulating board. Transmitting unit 23 and receiving unit 24 including an antenna and controller 25 implemented by a microcomputer are mounted to upper and lower surfaces of the circuit.

Electronic device 30, such as a television receiver, includes display 31 implemented by a display element, such as a liquid crystal display or plasma display, on a front surface of the device. Electronic device 30 accommodates remote control receiver 36. Remote control receiver 36 includes operation unit 32, transmitting unit 33 and receiving unit 34 including an antenna, and controller 35 implemented by a microprocessor. Operation unit 32 includes operation keys 32A and 32B including switch contacts.

Electronic device 40, such as a video disk recorder, includes actuator 41 provided on a front surface of the device for driving a tape or disk, and accommodates remote control receiver 46. Remote control receiver 46 includes operation unit 42, transmitting unit 43, receiving unit 44, and controller 45. Operation unit 42 includes operation keys 42A and 42B including switch contacts. Remote control system 101 includes remote control transmitter 26 and remote control receivers 36 and 46. Remote control system 101 remotely controls electronic devices 30 and 40 with remote control transmitter 26.

In remote control system 101, remote control transmitter 26 and remote control receivers 36 and 46 exchange signals via radio waves. This arrangement allows remote control transmitter 26 to remotely control electronic devices 30 and 40 even if remote control transmitter 26 is located far away from remote control receivers 36 and 46 and a shielding object, such as furniture, is located between remote control transmitter 26 and each one of remote control receivers 36 and 46. However, while a remote control system using radio waves may control an electronic device with a remote control transmitter from a position farther than that of a remote control system using infrared rays and ultrasonic waves, the radio waves reach another device in the room or a device in another room, thus possibly controlling an unintended device accidentally.

In remote control system 101 according to Embodiment 1, a user activates operation units 22, 32, and 42 before using electronic devices 30 and 40 as to select a receiver out of remote control receivers 36 and 46 using remote control transmitter 26 and to pair the elected remote control receiver with remote control transmitter 26, thereby controlling only the selected receiver and being prevented from controlling the other receiver. After that, the user controls the remote control receiver selected from remote control receivers 36 and 46 with remote control transmitter 26 to remotely control an electronic device connected to the selected remote control receiver out of electronic devices 30 and 40. A method of remotely controlling electronic devices 30 and 40 with remote control system 101 will be described below.

A method of remotely controlling electronic device 30 out of electronic devices 30 and 40 with remote control system 101 will be described below. FIGS. 3A to 3E schematically illustrate signals exchanged between remote control transmitter 26 and remote control receiver 36.

First, remote control receiver 36 connected to electronic device 30 is paired with remote control transmitter 26 by the following method. Remote control system 101 has predetermined pairing code L1 for pairing remote control receiver 36 with remote control transmitter 26. Controller 35 of remote control receiver 36 stores pairing code L1. The user activates and presses operation key 32A of remote control receiver 36. When operation key 32A of remote control receiver 36 is pressed, controller 35 detects the electrical connection and disconnection of switch contacts beneath operation key 32A and start a pairing operation. After that, the user activates and presses operation key 22A of remote control transmitter 26. When operation key 22A of remote control transmitter 26 is pressed, controller 25 detects electrical connection and disconnection of switch contacts beneath operation key 22A. Upon detecting that operation key 22A is pressed, controller 25 transmits pairing code L1 shown in FIG. 3A from transmitting unit 23 to remote control receiver 36 via radio waves.

Receiving unit 34 of remote control receiver 36 receives pairing code L1 transmitted from remote control transmitter 26. Controller 35 determines whether or not pairing code L1 stored in controller 35 is identical to the received pairing code. If these codes are not identical to each other, controller 35 of remote control receiver 36 does not execute any operation. If the pairing code stored in controller 35 is identical to the received pairing code, controller 35 of remote control receiver 36 transmits signal S101 shown in FIG. 3B from transmitting unit 33. Controller 35 produces and stores authentication code M1 corresponding to pairing code L1, and reads the stored authentication code M1. Signal S101 contains the read authentication code M1 and key address map N1 appended to authentication code M1. FIG. 3C schematically illustrates key address map N1. Controller 35 stores plural operation codes respectively corresponding to plural operations of electronic device 30, and read the stored operation codes. Key address map N1 shows an allocation in which plural operation keys of operation unit 22 of remote control transmitter 26 are allocated to plural operation codes. In key address map N1 shown in FIG. 3C, controller 35 stores operation code C11 to cause electronic device 30 to select channel "1" and operation code C12 to turn on and off electronic device 30. Operation code C11 is allocated to operation key 22B. Operation code C12 is to operation key 22H.

Upon receiving unit 24 of remote control transmitter 26 receiving signal S101, controller 25 stores authentication code M1 and key address map N1 to terminate the pairing operation between remote control transmitter 26 and remote control receiver 36, and simultaneously, causes remote control transmitter 26 to execute a learning operation storing operation codes for remotely controlling electronic device 30.

When the user activates and presses operation key 22B while directing remote control transmitter 26 which have executed the pairing operation and the learning operation to remote control receiver 36, controller 25 detects electrical connection and disconnection of switch contacts beneath operation key 22B. After that, controller 25 selects operation code C11 allocated to operation key 22B, which is pressed, from plural operation codes C11 and C12 shown in stored key address map N1. After that, controller 25 transmits signal S102 shown in FIG. 3D. Signal S102 contains authentication code M1 stored in controller 25 and selected operation code C11 appended to authentication code M1.

Upon receiving unit 34 of remote control receiver 36 receiving signal S102, controller 35 determines whether or not authentication code M1 contained in signal S102 is identical to the stored authentication code M1. If these codes are identical to each other, controller 35 causes electronic device 30 to execute an operation corresponding to operation code C11. Specifically, controller 35 causes electronic device 30 (the television receiver) to select channel "1" to display a program of channel "1" on display 31.

When the user activates and presses operation key 22H while directing remote control transmitter 26 which have executed the pairing operation and the learning operation to remote control receiver 36, controller 25 detects electrical connection and disconnection of switch contacts beneath operation key 22H. After that, controller 25 selects operation code C12 allocated to operation key 22H which is pressed out from plural operation codes C11 and C12 shown in stored key address map N1. After that, controller 25 transmits signal S103 shown in FIG. 3E. Signal S103 contains authentication code M1 stored in controller 25 and selected operation code C12 appended to authentication code M1.

Upon receiving unit 34 of remote control receiver 36 receiving signal S103, controller 35 determines whether or not authentication code M1 contained in signal S103 is identical to the stored authentication code M1. If these codes are identical to each other, controller 35 causes electronic device 30 to execute an operation corresponding to operation code C12. Specifically, controller 35 turns on and off electronic device 30.

If the authentication codes contained in signals S102 and S103 received is not identical to authentication code M1 stored in controller 35, controller 35 determines that the received signals are signals transmitted from a remote control transmitter other than remote control transmitter 26 paired with the receiver, and does not control electronic device 30.

Thus, remote control receiver 36 is operable to transmit operation codes C11 or C12 which is stored in the receiver and which is read to remote control transmitter 26. Remote control transmitter 26 is operable to allocate the transmitted operation code to operation unit 22, and transmit the allocated operation code to remote control receiver 36 according to an operation on operation unit 22. Remote control receiver 36 is operable to control electronic device 30 according to the operation code transmitted from remote control transmitter 26.

A method of remotely controlling electronic device 40 with remote control system 101 will be described below. FIGS. 4A to 4E schematically illustrate signals exchanged between remote control transmitter 26 and remote control receiver 46.

First, remote control receiver 46 connected to electronic device 40 is paired with remote control transmitter 26 by the following method. Remote control system 101 has predetermined pairing code L2 for pairing remote control receiver 46 with remote control transmitter 26. Controller 45 of remote control receiver 46 stores pairing code L2. The user activates and presses operation key 42A of remote control receiver 46. When operation key 42A of remote control receiver 46 is pressed, controller 45 detects the electrical connection and disconnection of switch contacts beneath operation key 42A and start a pairing operation. After that, the user activates and presses operation key 22A of remote control transmitter 26. When operation key 22A of remote control transmitter 26 is pressed, controller 25 detects electrical connection and disconnection of switch contacts beneath operation key 22A. Upon detecting that operation key 22A is pressed, controller 25 transmits pairing code L2 shown in FIG. 4A from transmitting unit 23 to remote control receiver 46 via radio waves.

Receiving unit 44 of remote control receiver 46 receives pairing code L2 transmitted from remote control transmitter 26. Controller 45 determines whether or not pairing code L2 stored in controller 45 is identical to the received pairing code. If these pairing codes are not identical to each other, controller 45 of remote control receiver 46 does not execute any operation. If the pairing code stored in controller 45 is identical to the received pairing code, controller 45 of remote control receiver 46 transmits signal S201 shown in FIG. 4B from transmitting unit 43. Controller 45 produces and stores authentication code M2 corresponding to pairing code L2, and reads the stored authentication code M2. Signal S201 contains authentication code M2 stored in controller 45 and key address map N2 appended to authentication code M2. FIG. 4C schematically illustrates key address map N2. Controller 45 stores plural operation codes respectively corresponding to plural operations of electronic device 40, and reads the stores operation codes. Key address map N2 shows an allocation in which plural operation keys of operation unit 22 of remote control transmitter 26 are allocated to plural operation codes. In key address map N2 shown in FIG. 4C, controller 45 stores operation code C21 for causing electronic device 40 to play back a video disk and operation code C22 for turning on and off electronic device 40. Operation code C21 is allocated to operation key 22D. Operation code C22 is allocated to operation key 22E.

Upon receiving unit 24 of remote control transmitter 26 receiving signal S201, controller 25 stores authentication code M2 and key address map N2 to terminate the pairing operation between remote control transmitter 26 and remote control receiver 46, and simultaneously, causes remote control transmitter 26 to execute a learning operation for storing an operation code for remotely controlling electronic device 40.

When the user activates and presses operation key 22B while directing remote control transmitter 26 which have executed the pairing operation and the learning operation to remote control receiver 46, controller 25 detects electrical connection and disconnection of switch contacts beneath operation key 22B. After that, controller 25 selects operation code C21 allocated to operation key 22B, which is pressed, from plural operation codes C21 and C22 shown in stored key address map N2. After that, controller 25 transmits signal S202 shown in FIG. 4D. Signal S202 contains authentication code M2 stored in controller 25 and selected operation code C21 appended to authentication code M2.

Upon receiving unit 44 of remote control receiver 46 receiving signal S202, controller 45 determines whether or not authentication code M2 contained in signal S202 is identical to the stored authentication code M2. If these codes are identical to each other, controller 45 causes electronic device 40 to execute an operation corresponding to operation code C21. Specifically, controller 45 causes actuator 41 of electronic device 40 (the video disk recorder) to drive a video disk for playback.

When the user activates and presses operation key 22H while directing remote control transmitter 26 which have executed the pairing operation and the learning operation to remote control receiver 46, controller 25 detects electrical connection and disconnection of switch contacts beneath operation key 22H. After that, controller 25 selects operation code C22 allocated to operation key 22H, which is pressed, from plural operation codes C21 and C22 shown in stored key address map N2. After that, controller 25 transmits signal S203 shown in FIG. 4E. Signal S203 contains authentication code M2 stored in controller 25 and selected operation code C22 appended to authentication code M2.

Upon receiving unit 44 of remote control receiver 46 receiving signal S203, controller 45 determines whether or not authentication code M2 contained in signal S203 is identical to the stored authentication code M2. If these codes are identical to each other, controller 45 causes electronic device 40 to execute an operation corresponding to operation code C22. Specifically, controller 45 turns on and off electronic device 40.

If the authentication codes contained in received signals S202 and S203 are identical to authentication code M2 stored in controller 45, controller 45 determines that the received signals are signals transmitted from a remote control transmitter other than remote control transmitter 26 paired, and does not control electronic device 40.

If remote control receiver 36 connected to electronic device 30 receives signals S202 and S203, authentication code M2 contained in received signals S202 and S203 are not identical to authentication code M1 for electronic device 30, hence preventing controller 35 from controlling electronic device 30.

Thus, remote control system 101 including remote control transmitter 26 and remote control receivers 36 and 46 reduces operation errors, such as the pressing of wrong operation keys, and facilitates the learning operation of remote control transmitter 26 with a simple operation, and allows remote control transmitter 26 which has executed the learning operation to remotely control electronic devices 30 and 40 reliably. In the remote control system according to the embodiment, the operation codes stored in remote control receivers 36 and 46 are sent to remote control transmitter 26 according to a predetermined operation on operation unit 22 of remote control transmitter 26 by the user. This arrangement allows remote control transmitter 26 to execute the learning operation by pressing a small number of operation keys, such as operation keys 22A and 22C. That is, remote control transmitter 26 can store operation codes reliably by such simple operation, and allows the user to remotely control electronic devices 30 and 40 with remote control transmitter 26 according to the stored operation codes.

Exemplary Embodiment 2

Figure 5:
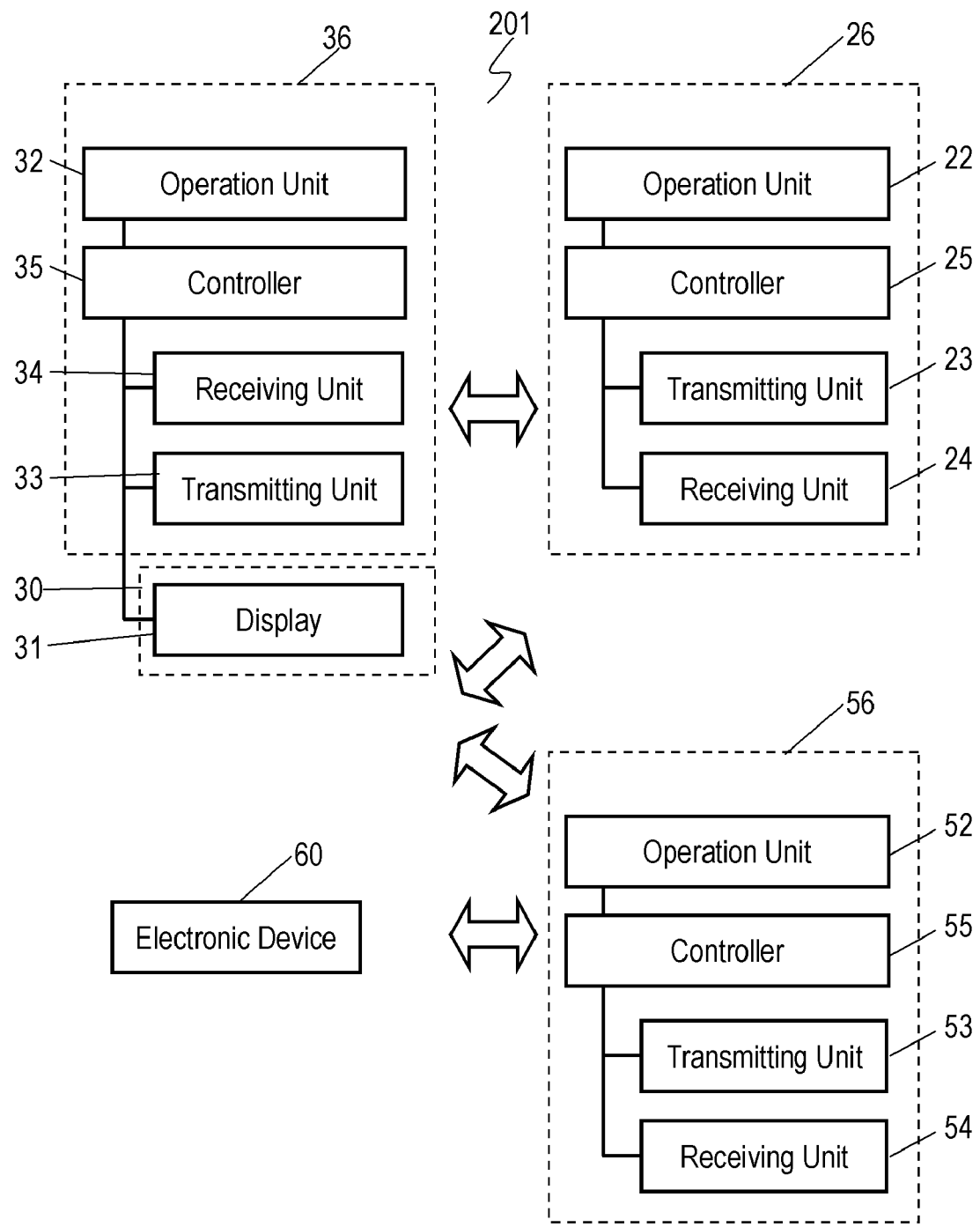
FIG. 5 is a circuit block diagram of a remote control system according to Exemplary Embodiment 2.
Figure 6:
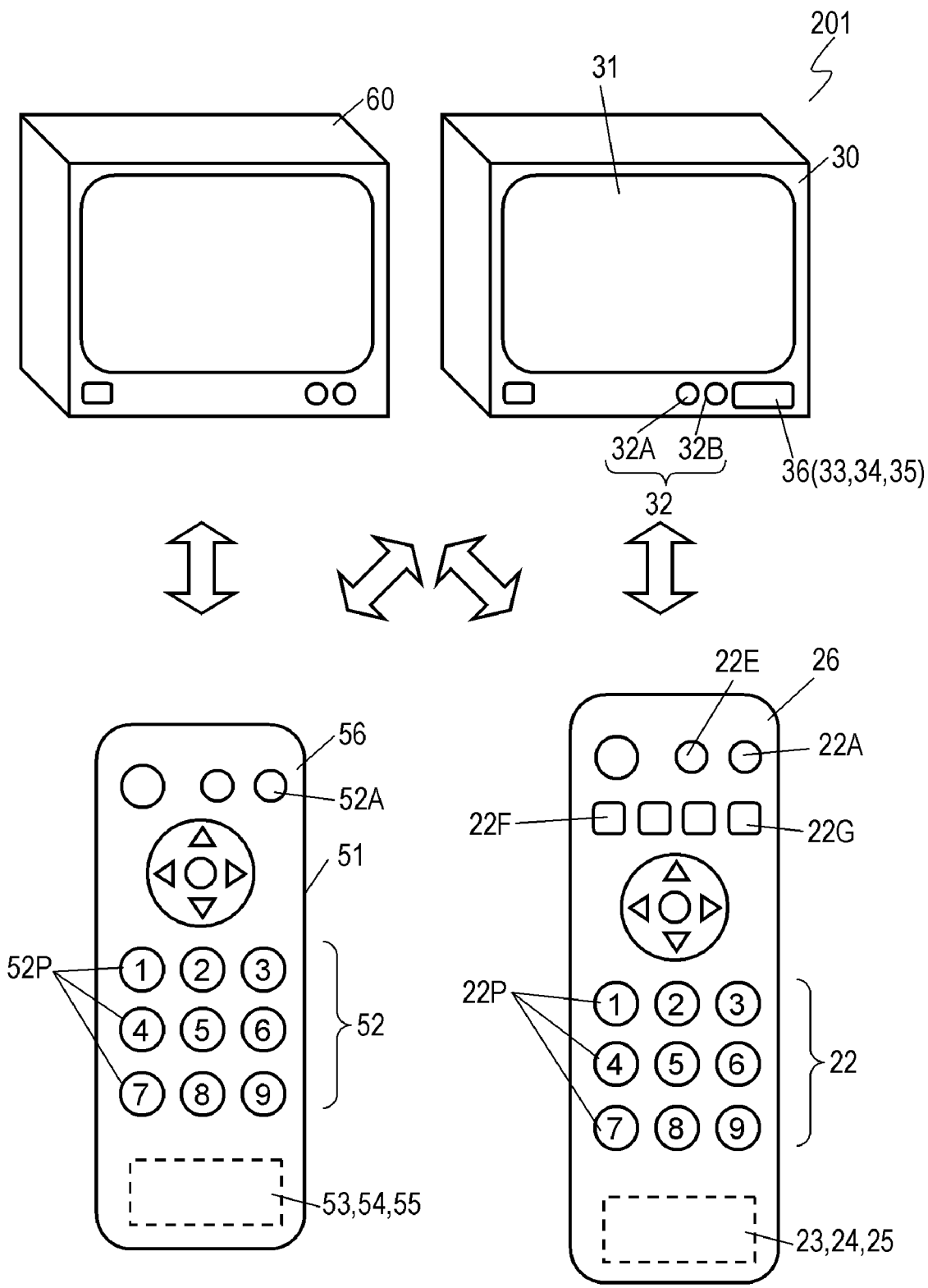
FIG. 6 is a schematic diagram of the remote control system according to Embodiment 2.

FIGS. 5 and 6 are a circuit block diagram and a schematic diagram of remote control system 201 according to Exemplary Embodiment 2. In FIGS. 5 and 6, components identical to those of remote control system 101 according to Embodiment 1 shown in FIGS. 1 and 2 are denoted by the same reference numerals. Remote control system 201 includes remote control transmitter 26 and remote control receiver 36, and further includes remote control transmitter 56. Remote control receiver 36 is connected to electronic device 30, a television receiver.

Remote control transmitter 56 includes case 51 and operation unit 52 provided on upper and side surfaces of case 51. Operation unit 52 includes plural operation keys 52P. Case 51 accommodates transmitting unit 53 and receiving unit 54 including an antenna, and controller 55 implemented by a microprocessor. Controller 55 of remote control transmitter 56 stores an operation code for controlling electronic device 60, such as a television receiver other than electronic device 30. Remote control system 201 includes remote control transmitters 26 and 56 and remote control receiver 36.

Remote control transmitter 56 can be paired with remote control receiver 36 similarly to remote control transmitter 26.

Remote control receiver 36 does not store an operation code for controlling electronic device 60. A learning operation in which remote control transmitter 26 stores an operation code which controls electronic device 60 and which is stored in remote control transmitter 56 will be described below. FIGS. 7A to 7E schematically illustrate signals exchanged between remote control receiver 36 and each of remote control transmitters 26 and 56.

First, remote control receiver 36 is paired with remote control transmitter 56 by the following method. Remote control system 101 has predetermined pairing code L3 for pairing remote control receiver 36 with remote control transmitter 56. Controller 35 of remote control receiver 36 stores pairing code L3. A user activates and presses operation key 32A of remote control receiver 36. Upon operation key 32A of remote control receiver 36 being pressed, controller 35 detects electrical connection and disconnection of switch contacts beneath operation key 32A to start a pairing operation. After that, the user activates and presses operation key 52A of remote control transmitter 56. Upon operation key 52A of remote control transmitter 56 being pressed, controller 55 detects electrical connection and disconnection of switch contacts beneath operation key 52A. Upon detecting that operation key 52A is pressed, controller 55 transmits signal S301 shown in FIG. 7A from transmitting unit 53 to remote control receiver 36 via radio waves. Signal S301 contains pairing code L3.

Receiving unit 34 of remote control receiver 36 receives signal S301 containing pairing code L3 transmitted from remote control transmitter 56. Controller 35 determines whether or not pairing code L3 stored in controller 35 is identical to the received pairing code. If these pairing codes are not identical to each other, controller 35 of remote control receiver 36 does not execute any operation. If these pairing codes are identical to each other, controller 35 of remote control receiver 36 produces and stores authentication code M3 corresponding to pairing code L3, and transmits signal S302 shown in FIG. 7B from transmitting unit 33. Signal S302 contains authentication code M3 stored in controller 35. Thus, remote control transmitter 56 stores authentication code M3 allowing transmitter 56 to communicate with remote control receiver 36.

Similarly to Embodiment 1, remote control transmitter 26 is paired with remote control receiver 36. Upon operation key 22E of remote control transmitter 26 being pressed for a predetermined time, e.g. 2 seconds, controller 25 detects electrical connection and disconnection of switch contacts beneath operation key 22E, and sets controller 25 to a set mode.

Next, the user activates and presses operation key 22F for learning, and then, activates and pressed operation keys, such as operation keys 22P indicating channels "1" to "9", to which operation codes are allocated, respectively sequentially in this order. Then, the user presses operation key 22E again. Controller 25 stores operation keys 22P pressed and the order in which operation keys 22P are pressed. Controller 25 detects electrical connection and disconnection beneath operation key 22E, and transmits signal S303 shown in FIG. 7C from transmitting unit 23 to remote control receiver 36 via radio waves. Signal S303 contains authentication code M1 determined between remote control transmitter 26 and remote control receiver 36, and set code P1 appended to authentication code M1. Set code P1 contains the number of operation keys 22P of remote control transmitter 26 which are pressed.

Upon receiving unit 34 of remote control receiver 36 receiving signal S303, controller 35 determines whether or not authentication code M1 contained in signal S303 is identical to authentication code M1 stored in controller 35. If these authentication codes are identical to each other, controller 35 sets receiver 36 in a set mode.

After that, the user activates and presses operation keys of remote control transmitter 56 corresponding to operation codes to be stored in remote control transmitter 26, for example, presses operation keys 52P indicating numerals "1" to "9" for channel selection in this order to electrically connect and disconnect switch contacts beneath the operation keys. Controller 55 detects the electrical connection and disconnection and transmits signals S3021 to S3029 shown in FIG. 7D from transmitting unit 53 to remote control receiver 36 via radio waves upon operation keys 52P indicating the numerals "1" to "9" being pressed, respectively. Signal S3021 contains authentication code M3 and operation code C31 appended to authentication code M3. Similarly, signal S3022 contains authentication code M3 and operation code C32 appended to authentication code M3. Signal S3023 contains authentication code M3 and operation code C33 appended to authentication code M3. Signal S3024 contains authentication code M3 and operation code C34 appended to authentication code M3. Signal S3025 contains authentication code M3 and operation code C35 appended to authentication code M3. Signal S3026 contains authentication code M3 and operation code C36 appended to authentication code M3. Signal S3027 contains authentication code M3 and operation code C37 appended to authentication code M3. Signal S3028 contains authentication code M3 and operation code C38 appended to authentication code M3. Signal S3029 contains authentication code M3 and operation code C39 appended to authentication code M3. When each of operation keys 52P, numeric key "1" to "9" is pressed, controller 55 transmits, from transmitting unit 53 to electronic device 60, operation codes C31 to C39 as to remotely control electronic device 60.

Figure 7A:
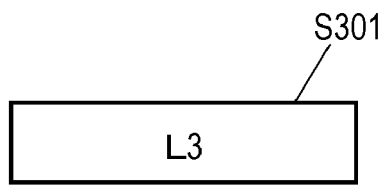
FIGS. 7A to 7E schematically illustrate signals of the remote control system according to Embodiment 2.
Figure 7B:
Figure 7C:
Figure 7D:
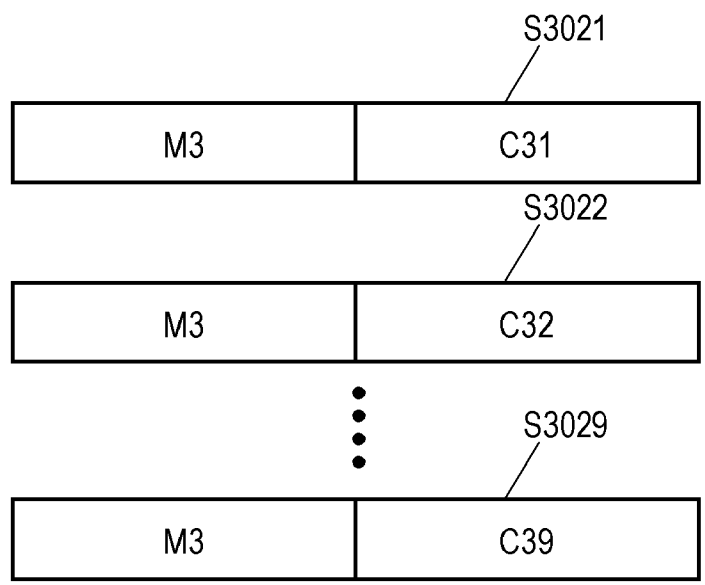
Figure 7E:
Figure 9:
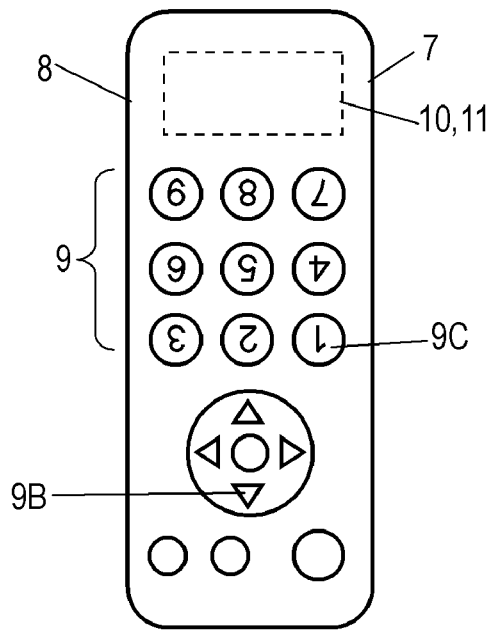
FIG. 9 is a plan view of conventional remote control transmitters.
Figure 9:
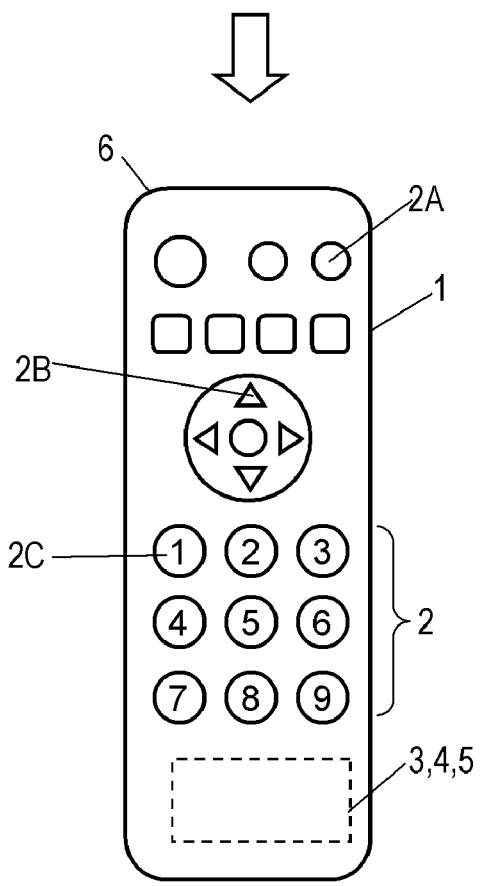

Upon receiving unit 34 of remote control receiver 36 receiving signals S3021 through S3029, controller 35 transmits signals S3031 to S3039 shown in FIG. 7C from transmitting unit 33 to remote control transmitter 26 via radio waves, respectively. That is, upon receiving unit 34 of remote control receiver 36 receiving signal S3021, controller 35 transmits signal S3031 from transmitting unit 33 to remote control transmitter 26 via radio waves. Controller 35 stores the number of operation keys 22P indicating numerals "1" to "9" of remote control transmitter 26 which are pressed, that is stores the number of nine according Embodiment 2 contained in set code P1. Upon transmitting unit 33 transmits signals S3031 to 3039, controller 35 counts the number of signals S3031 to 3039, and transmits signals S3031 to 3039 by the stored number from transmitting unit 33 to remote control transmitter 26. Controller 35 stops transmitting signals S3031 to S3039 to remote control transmitter 26 when the counted number of signals S3031 to S3039 counted exceeds the stored number (nine according to Embodiment 2).

Controller 25 of remote control transmitter 26 stores the order of pressed operation key 22P. Upon receiving unit 24 receiving each of signals S3031 through 3039, controller 25 allocates operation codes C31 to C39 which are contained in signals S3031 to 3039, respectively, to operation key 22P indicating numerals "1" to "9" in the stored order. Thus, controller 26 terminates the learning operation in which operation codes C31 to C39 sent from remote control transmitter 56 are stored in remote control transmitter 26.

Thus, remote control transmitter 26 can store, by the learning operation, not only the operation codes stored in remote control receiver 36, but also operation codes stored in remote control transmitter 56. Upon the user activating and pressing an operation key out of operation keys 22P of remote control transmitter 26 which has executed the learning operation, controller 25 transmits an operation code out of stored operation codes C31 to C39 allocated to the pressed operation key, from transmitting unit 23 to electronic device 60. Upon the operation code being transmitted from remote control transmitter 26, electronic device 60 executes an operation corresponding to the operation code in the same manner as an operation code transmitted from remote control transmitter 56. Single remote control transmitter 26 can remotely control both of electronic devices 30 and 60.

That is, remote control transmitter 56 is operable to transmit operation codes C31 to C39 to remote control receiver 36. Remote control receiver 36 is operable to transmit the transmitted operation codes to remote control transmitter 26. Remote control transmitter 26 is operable to allocate, to operation unit 22, the operation codes transmitted from remote control receiver 36, and to transmit the allocated operation codes to electronic device 60 according to an operation on operation unit 22 as to control electronic device 60. In remote control system 201 according to Embodiment 2, upon the user activating and pressing single operation key 22F once, controller 26 may alternately switch an electronic device out of electronic devices 30 and 60 to which remote control transmitter 26 transmits the signals.

A method for deleting the operation codes for one electronic device stored in remote control transmitter 26 storing operation codes for controlling plural electronic devices will be discussed. First, when the user activates and presses operation key 22F for learning, and then, presses operation key 22G for deleting for a predetermined time, e.g. for 5 seconds, controller 25 deletes operation code C31 to C39 of electronic device 60 allocated to operation key 22F. Thus, a predetermined operation to operation unit 22 of remote control transmitter 26 deletes a certain operation code stored, and hence, controller 25 does not require a very large storage capacity, and can be implemented by a relatively inexpensive microprocessor.

Exemplary Embodiment 3

FIGS. 8A to 8C schematically illustrate signals exchanged in a remote control system according to Exemplary Embodiment 3. The remote control system according to Embodiment 3 includes remote control transmitters 26 and 56 and remote control receiver 36, similarly to the remote control system according to Embodiment 2 shown in FIGS. 5 and 6. According to Embodiment 2, remote control receiver 36 transmits signal S3031 to S3039 to remote control transmitter 26 every time each of signals S3021 to S3029 is transmitted from remote control transmitter 56 to execute the learning operation of remote control transmitter 26.

According to Embodiment 3, remote control transmitter 56 transmits signal S401 shown in FIG. 8A instead of signals S3021 to S3029 to remote control receiver 36. Signal S401 contains authentication code M3 and key address map N3 appended to authentication code M3.

FIG. 8B illustrates key address map N3. Key address map N3 shows an allocation in which operation codes C31 to C39 are allocated to operation keys 52P similarly to key address map N1 shown in FIG. 3C according to Embodiment 1.

Upon receiving unit 34 of remote control receiver 36 receiving signal S401, controller 35 transmits signal S402 shown in FIG. 8C from transmitting unit 33 to remote control transmitter 26 via radio waves. Signal S402 contains authentication code M1 and key address map N3 appended to authentication code M1. Upon receiving unit 24 of remote control transmitter 26 receiving signal S402, controller 25 extracts key address map N3 from signal S401 and allocates operation codes C31 to C39 contained in key address map N3 to plural operation keys 22P in the order stored. This operation reduces the number of pressed operation keys for the learning operation for storing an operation code for remote control transmitter 56 in remote control transmitter 26.

According to the above embodiments, the signals are explained as signals containing authentication codes M1, M2, and M3 and the operation codes, or one or two codes out of pairing code L1, set code P1, and others, in order to make the configuration easy to be understood. Actually, the signals contain these codes and various codes, such as a header code determined by each device or model.

In the above description, the remote control system exchange signals mainly via radio waves. Transmitting unit 23 and receiving unit 24 can include a light emitting diode and a light receiving element instead of the antenna, and employ infrared rays as the remote control signals, thus providing the same effects.

What is claimed is:

1. A remote control system comprising:
a remote control receiver storing a first operation code controlling a first electronic device;
a first remote control transmitter including an operation unit, wherein
the remote control receiver is operable to transmit the stored first operation code to the first remote control transmitter,
the first remote control transmitter is operable to:
store the transmitted first operation code; and
transmit the first operation code stored in the first remote control transmitter to the remote control receiver according to operation on the operation unit,
the remote control receiver is operable to control the first electronic device according to the first operation code transmitted from the remote control transmitter, and
the remote control system further comprises a second remote control transmitter storing a second operation code controlling a second electronic device, wherein
the second remote control transmitter is operable to transmit the stored second operation code to the remote control receiver,
the remote control receiver is operable to transmit the transmitted second operation code to the first remote control transmitter, and
the first remote control transmitter is operable to:
allocate, to the operation unit, the second operation code transmitted from the remote control receiver; and
transmit the allocated second operation code to the second electronic device according to operation on the operation unit as to control the second electronic device.

2. The remote control system of claim 1, wherein
the operation unit of the first remote control transmitter includes a first operation key and a second operation key,
the remote control receiver is operable to:
store a second operation code controlling the first electronic device;
transmit a key address map to the first remote control transmitter, the key address map showing an allocation for allocating the stored first operation code and the stored second operation code stored to the first operation key and the second operation key of the first remote control transmitter, to the first remote control transmitter; and
transmit the stored first operation code and the stored second operation code to the remote control transmitter,
the first remote control transmitter is operable to:
allocate the transmitted first operation code and the transmitted second operation code to the first operation key and the second operation key according to the key address map; and
transmit the first operation code and the second operation code allocated, to the remote control receiver according to operation on the first operation key and the second operation key, and
the remote control receiver is operable to control the first electronic device according to the first operation code and the second operation code transmitted from the remote control transmitter.

\* \* \* \* \*